United States Patent [19]

Jones et al.

[11] Patent Number: 4,901,173

[45] Date of Patent: Feb. 13, 1990

[54] APPARATUS FOR COUPLING RECORD DISK TO DISK DRIVE

[76] Inventors: David E. Jones, 1289 E. 800 North, Layton, Utah 84041; Robert D. Freeman, 4439 S. 1800 West, Roy, Utah 84067; Randall C. Bauck, 1256 E. 800 North, Layton, Utah 84041

[21] Appl. No.: 238,980

[22] Filed: Aug. 24, 1988

Related U.S. Application Data

[63] Continuation of Ser. No. 854,333, Apr. 21, 1986, abandoned.

[51] Int. Cl.$^4$ .............................................. G11B 5/016
[52] U.S. Cl. .............................. 360/99.04; 360/97.01; 360/99.08; 360/133
[58] Field of Search ............... 360/86, 133, 135, 97.01, 360/98.07, 98.08, 99.04, 99.05, 99.08

[56] References Cited

U.S. PATENT DOCUMENTS

| 4,613,921 | 9/1986 | Holmes | 360/133 |
| 4,648,001 | 3/1987 | Komatsu et al. | 360/133 |

FOREIGN PATENT DOCUMENTS

| 58-125279 | 7/1983 | Japan | 369/270 |
| 58-164070 | 9/1983 | Japan | 369/270 |
| 59-87677 | 5/1984 | Japan | 369/270 |
| 60-229284 | 11/1985 | Japan | 360/133 |

OTHER PUBLICATIONS

Beach et al., "Removable Disk Pack Assemblies", IBM Tech. Disc. Bull., vol. 21, No. 3, Aug. 1978.

*Primary Examiner*—John H. Wolff
*Attorney, Agent, or Firm*—Woodcock, Washburh, Kurtz, Mackiewicz & Norris

[57] ABSTRACT

A device for coupling and aligning a rotatable disk with the motor used for rotating that disk is disclosed. The end of the motor drive shaft includes a drive spindle having a V shaped slot in its surface. This slot accepts an aligning pin which protrudes from the center of the disk. When the aligning pin is at the apex of the V slot, the disk to be rotated is concentric with the drive spindle. A drive pin, which is mounted eccentrically on the drive spindle, is in contact with a lip on the outer surface of the disk hub. Rotation of the drive spindle causes interference between the drive pin and the lip thereby imparting rotatational momentum to the disk as well as a centering force on the aligning pin.

8 Claims, 7 Drawing Sheets

APPARATUS FOR COUPLING RECORD DISK TO DISK DRIVE

This is a continuation of application Ser. No. 854,333 filed Apr. 21, 1986, now abandoned.

RELATED APPLICATIONS

This application is related by subject matter to the following commonly assigned co-pending applications, all of which are incorporated herein by reference; application Ser. No. 854,342 now abandoned; application Ser. No. 854,419 now U.S. Pat. No. 4,740,851; application Ser. No. 854,130 now U.S. Pat. No. 4,794,480 and application Ser. No. 854,292 now U.S. Pat. No. 4,743,989 all filed Apr. 21, 1986.

BACKGROUND OF THE INVENTION

This invention relates to an apparatus for coupling and aligning a record disk to the drive spindle in a disk drive.

The use of flexible magnetic disks or "floppy disks" to store and retrieve data has become very popular in the field of magnetic data processing. These disks are not typically part of the disk drive unit but are typically inserted and removed from the disk drive as needed. Typically the disk is enclosed in a flat rectangular cartridge having an opening which exposes the central portion of the disk to a drive means within the disk drive. Once the disk is inserted into the disk drive, it is necessary to engage the disk with the motor spindle so that the disk can be rotated.

Due to the portability of the floppy disks currently in use, the disk drive must contain an apparatus for aligning and rotating the disk once the cartridge is inserted into the drive. Such a disk centering and rotating apparatus should have the ability to positively and effectively center the disk with respect to the axis of rotation of the drive spindle and maintain that position during rotation of the disk. Other objectives of such a centering and aligning apparatus are simplicity, low cost and minimization of wear on the disk and the drive apparatus.

The prior art has been relatively unsuccessful in achieving these objectives. Apparatus disclosed by the prior art have been generally complex and have caused wear of the floppy disk. This wear of the disk frequently results in further difficulty in achieving the proper alignment between the disk and the drive spindle. One of the major draw backs of the prior art is the use of devices which transfer energy from the motor spindle to the disk by clamping the disk surface between two rotating members. The use of a clamping device such as this generally requires that the clamping surfaces be opened when the disk is inserted into the disk drive and closed when the disk is in its proper position. The prior art also required relatively elaborate means for positioning the disk relative to the clamping means prior to closing the clamping means on the disk. These features of the prior art resulted in bulkier and more expensive disk drives and increased wear and tear on the floppy disks. For example, several prior art apparatus use a magnetic means to center the disk hub on the motor spindle. See U.S. Pat. No. 3,975,768 - Jacques et al, U.S. Pat. No. 3,593,327 - Shill, U.S. Pat. No. 4,131,199 - Hatchet et al. Examples of prior art devices which use a clamping mechanism to rotate the disk are U.S. Pat. No. 3,940,793 - Bleiman, U.S. Pat. No. 4,125,883 - Rolf, U.S. Pat. No. 3,815,150 - Stoddard et al, U.S. Pat. No. 3,678,481 - Warren et al.

SUMMARY OF THE INVENTION

According to the basic concept of this invention a disk is aligned with the drive spindle of a disk drive by means of a V shaped slot in the surface of the spindle which accepts a peg protruding from the center of the disk as the disk cartridge is inserted into the drive. In this way, the disk can be centered on the drive spindle without any relative motion between the disk hub and the drive spindle in a direction normal to the plane of the disk. The disk is then coupled for rotation by a drive peg mounted eccentrically on the spindle and in contact with a lip on the outer surface of the disk hub. When the spindle turns, an inertial and frictional torque is exerted on the disk which serves to both rotate the disk and center the disk on the spindle. The drive spindle causes the rotation and centering of the disk through contact with the lip on the outer surface of the disk hub.

It is an object of this invention to provide a simple and effective apparatus for aligning and coupling the drive spindle of a disk drive with a disk inserted therein.

It is another object of this invention to provide a disk drive which has a minimum amount of space and equipment devoted to the operation of aligning and coupling the drive spindle with the disk.

It is a still further object of this invention to provide a disk drive apparatus which minimizes wear and tear on the disk but achieves improved operational coupling of the disks to the drive.

Other features and advantages of the invention will become apparent from the following more detailed description and the appended claims.

SHORT DESCRIPTION OF THE DRAWINGS

FIG. 7b is a front cross sectional view showing a disk hub coupled to a drive spindle according to this invention, taken substantially along line 7b—7b of FIG. 7a.

DESCRIPTION OF THE PREFERRED EMBODIMENT

General Description

The present invention is directed to a device for rotating and aligning a disk to be used as a record media in a disk drive system. Although the device of the invention is not so limited, it will be described below in relation to the rotation and alignment of a floppy disk pair to be used as a record media in a magnetic disk drive. The floppy disk pair is rotatably contained in a rigid cartridge insertable into the disk drive. An aperture in the cartridge exposes the disk hub of this invention to the drive spindle contained within the disk drive. The disc hub is comprised of a relatively rigid plastic material integrally attached to each of the disks. The cartridge is enclosed by a movable protective cover. When in the open position, this cover allows access to the disk hub through the opening in the cartridge.

The cartridge enters the disk drive through a slot in the front face of the drive. Upon entering the disk drive, a guide means within the disk drive insures movement of the cartridge in a fixed plane relative to the interior of the disk drive, as disclosed fully in co-pending application Ser. No. 854,419, filed Apr. 21, 1986 now U.S. Pat. No. 4,740,851. The drive spindle of this invention is held fixed relative to the disk drive such that the drive spindle and the disk hub properly mate as disclosed hereinafter. The motor spindle of this invention is coaxially attached to the drive shaft of the drive motor within the disk drive. The motor is equipped with a, sensing device, as disclosed in co-pending application Ser. No. 854,342, filed Apr. 21, 1986, which insures that the open end of an aligning slot in the surface of the drive spindle is facing toward the disk hub as the cartridge is inserted into the disk drive. In this way the aligning slot of the motor spindle is caused to be radially aligned with an aligning pin on the disk hub when the cartridge is fully inserted into the disk drive.

Detailed Description

Figure 1:
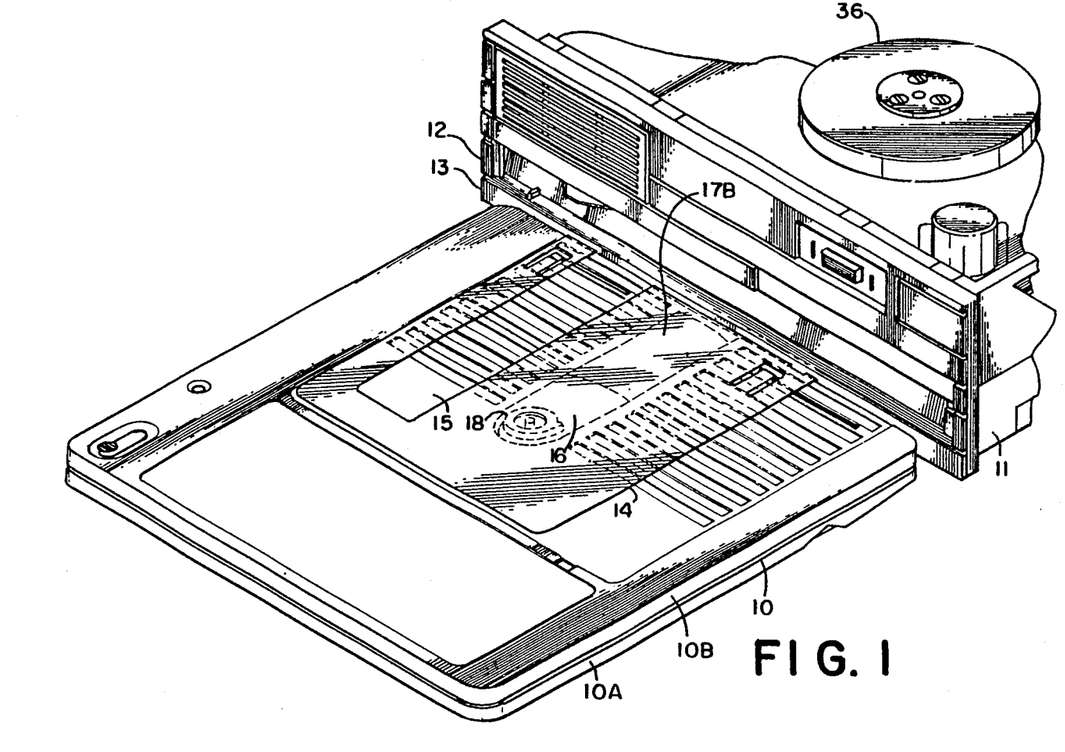
FIG. 1 is a top perspective view of a cartridge containing a floppy disk made according to this invention as it is about to enter into a disk drive containing a drive spindle made according to this invention.

Referring to FIG. 1, the floppy disk pair to be coupled and aligned using this invention is contained within rigid cartridge 10. Cartridge 10 is shown in a top perspective as it is about to enter disk drive 11 through slot 12. Slot 12 is normally closed by a hinged cover 13 which is moved to an open position as cartridge 10 is inserted into the drive.

Cartridge 10 is partially enclosed by a slidable cover 14. This cover has an offset aperture 15 in its top surface. When cartridge 10 is inserted into slot 12 cover 14 is moved to the right such that opening 15 exposes the central portion of cartridge 10. The mechanism which actuates movement of the cover 14 is contained within the disk drive. Mechanisms for achieving this movement can be mechanisms well known in the art or the preferred mechanism as disclosed in co-pending application Ser. No. 854,292, filed Apr. 21, 1986.

When cover 14 is in the open position, aperture 15 is coincidental with aperture 16 in the cartridge top. This aperture is revealed in phantom in FIG. 1 by the dash lines running radially from the center of the cartridge. Access to the disk pair and to disk hub 18, which are both also revealed by the dash lines in FIG. 1, is achieved through opening 16 when cartridge 10 is inserted into slot 12 and when cover 14 is in the open position.

Figure 2:
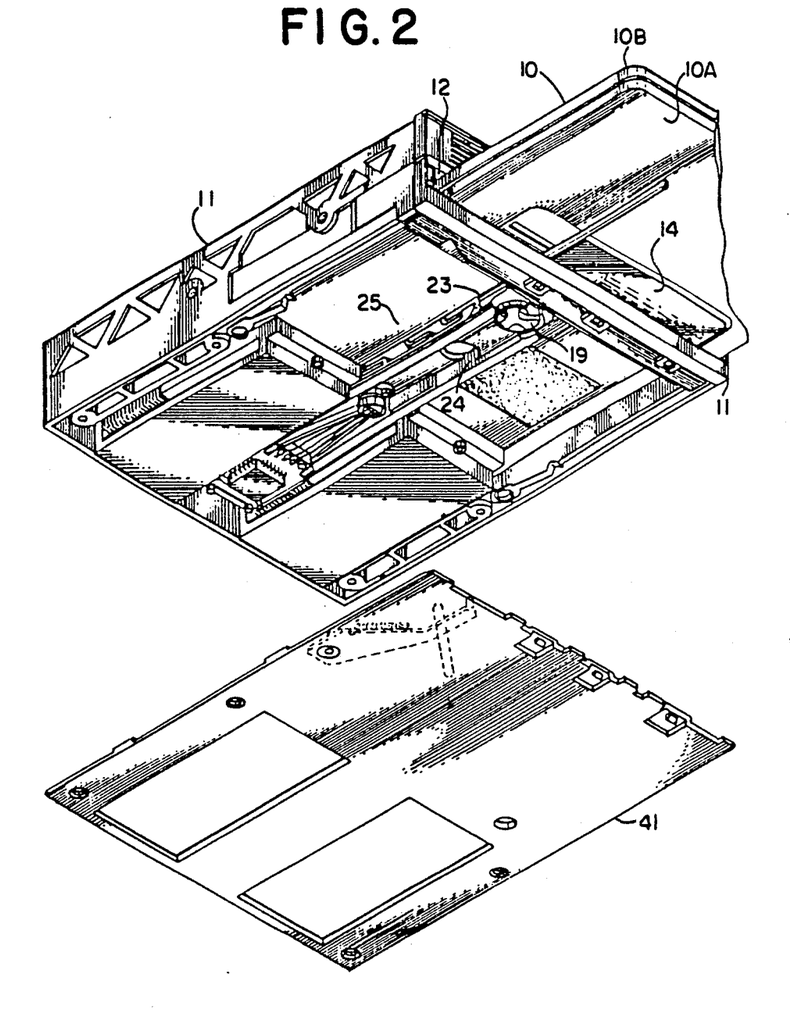
FIG. 2 is an exploded bottom perspective view of a disk drive containing a drive spindle made according to this invention having a cartridge containing a disk hub made according to this invention partially inserted therein

In FIG. 2, cartridge 10 is shown partially inserted into disk drive 11 through slot 12 from a bottom perspective in which the base cover 41 of disk drive 11 has been exploded away to reveal a portion of drive spindle 19. In this view, cartridge 10 is partially inserted into disk drive 11 but not to the extent required for the cartridge to register with the spicule member 24. It should be noted that cover 14 has been moved to the open position, and that disk hub 18 is not revealed in this perspective since it is contained in the top portion of cartridge 10. Further insertion of cartridge 10 into disk drive 11 will cause registry between spicule member 24 and opening 16 in cartridge top 10B. This registry holds cartridge 10 in a fixed plane relative to the plane formed by the lower surface of drive spindle 19. When cartridge 10 is fully inserted into disk drive 11, disk hub 18 will engage drive spindle 19 as disclosed below. As the term is used herein, a drive spindle is that portion of the disk drive which engages a disk for transferal of energy from a drive means to the disk for rotation of the disk.

Figure 3:
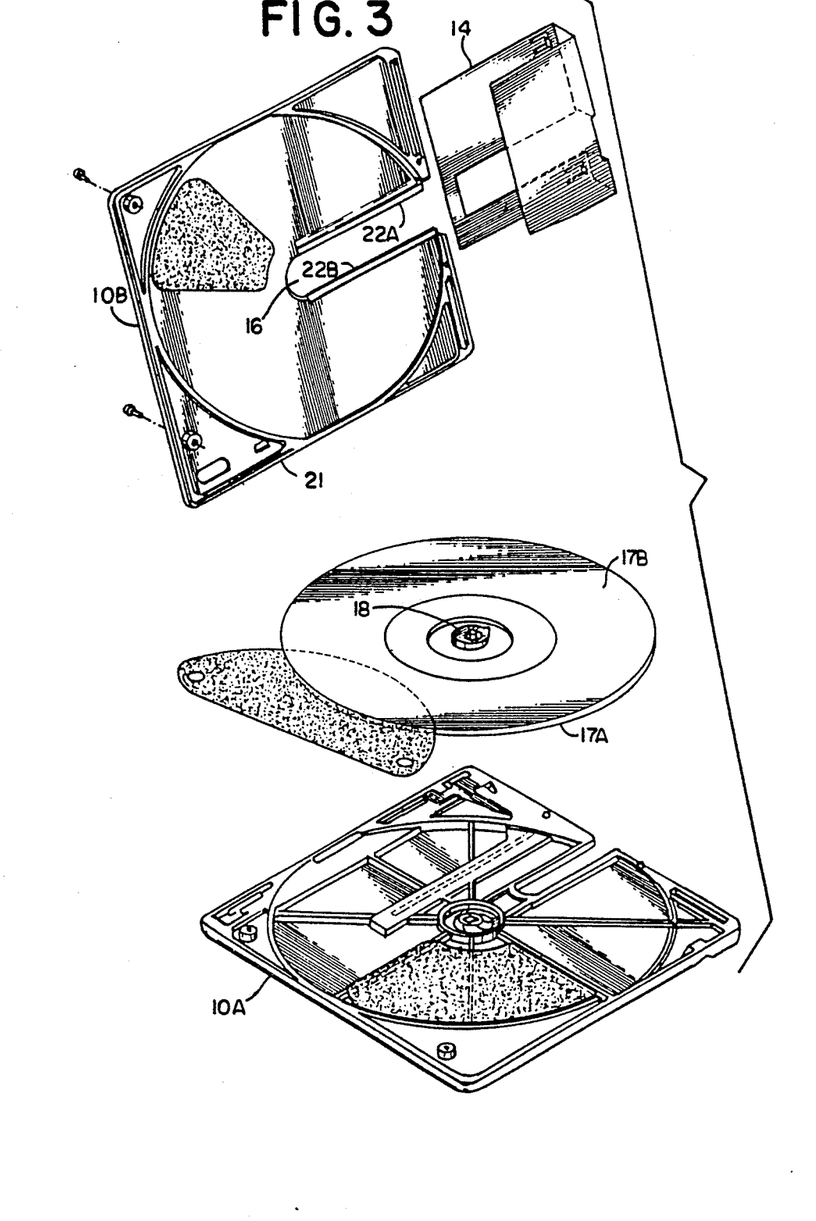
FIG. 3 is an exploded perspective view of a disk cartridge containing a disk hub made according to this invention.
Figure 5A:
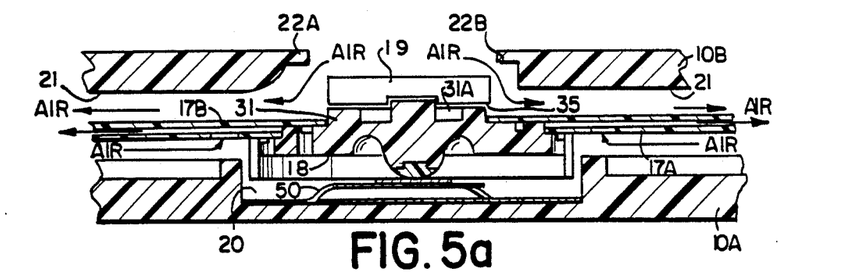
FIG. 5a is a cross sectional view of the central portion of an assembled cartridge, showing the relationship of the disk hub to the drive spindle when the cartridge is fully inserted in the disk drive.
Figure 5B:
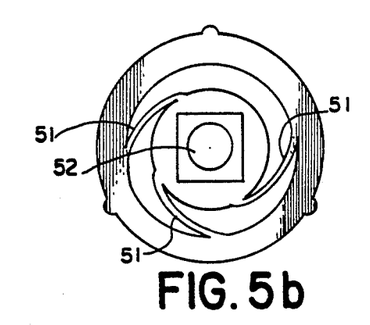
FIG. 5b is a top plan view of the dome shaped spring used in the cartridge of this invention.
Figure 7A:
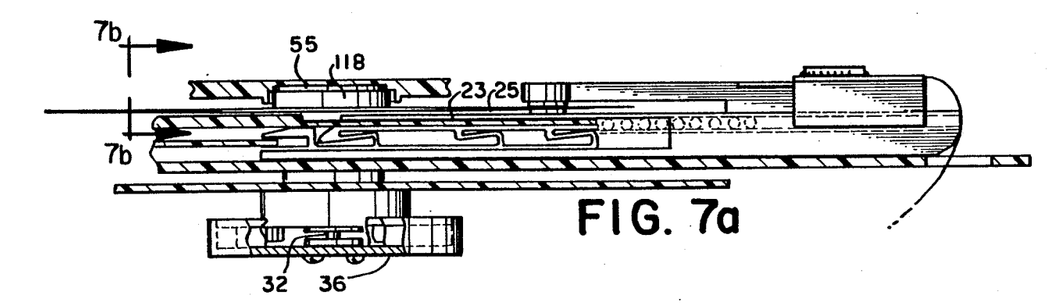
FIG. 7a is a side cross sectional view of a disk coupled to a drive spindle according to this invention, taken substantially along line 7a—7a of FIG. 6.
Figure 7B:
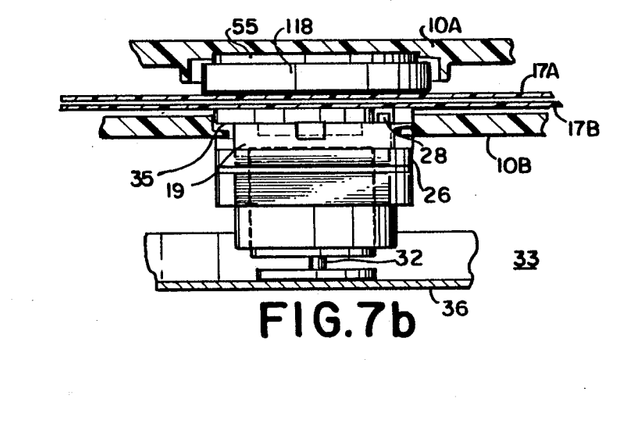

FIG. 3 discloses the manner in which disk hub 18 and floppy disks 17A and 17B are held within cartridge 10. FIG. 3 is an exploded view of cartridge 10 which shows: cartridge top 10B removed from cartridge bottom 10A, cover 14 removed from cartridge 10, and floppy disks 17A and 17B mounted to disk hub 18. When cartridge 10 is assembled, the lower portion of disk hub 18 sits in dishlike opening 20 in cartridge bottom 10A. Between the lower portion of disk hub 18 and the bottom of dishlike opening 20 is a resilient member 50 which urges the upper surface of disk 17B towards the inside surface 21 of cartridge top 10B. In one embodiment of this invention the resilient member is an elastomeric disc as shown in FIGS. 7a and 7b, while in the preferred embodiment the resilient member is a domed shaped sheet metal spring 50 having spiral members 51 for resiliency, as shown in FIGS. 3, 5a and 5b. Two important functions are performed by spring 50: the top 52 of the spring provides a flat, low friction surface on which disk hub 18 rotates; and the resilient force of spiral elements 51 provides proper surface to surface interaction between disk hub 18 and drive spindle 19, as disclosed fully latter in the specification. Thus, when cartridge 10 is assembled, the upper portion of disk hub 18 is within aperture 16 and is held in this position by spring 50. Disk hub 18 is thus accessible through opening 16 when the cartridge is assembled and the cover 14 is in the open position.

Figure 4:
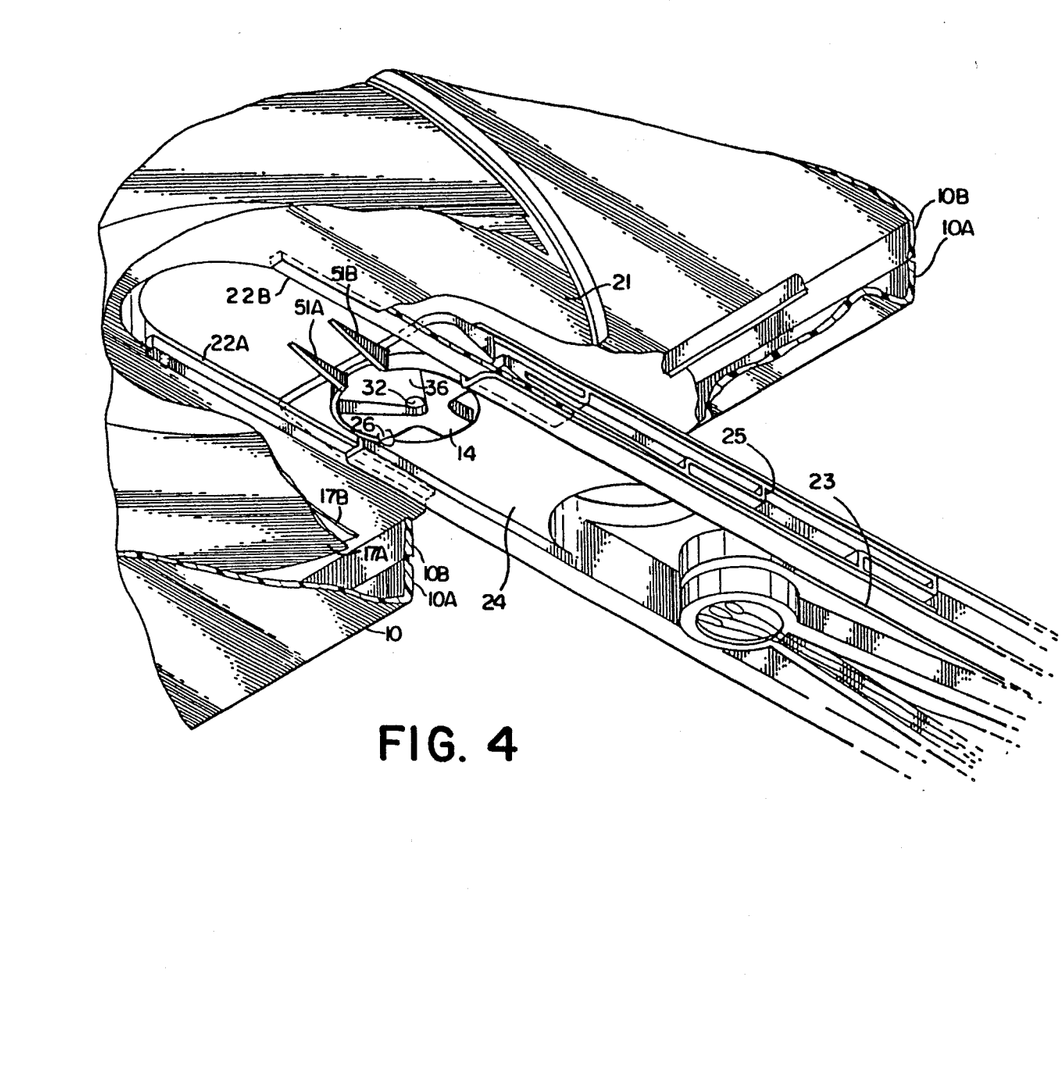
FIG. 4 is a cut away perspective view from below of a cartridge in engagement with a disk drive made according to this invention.
Figure 5C:
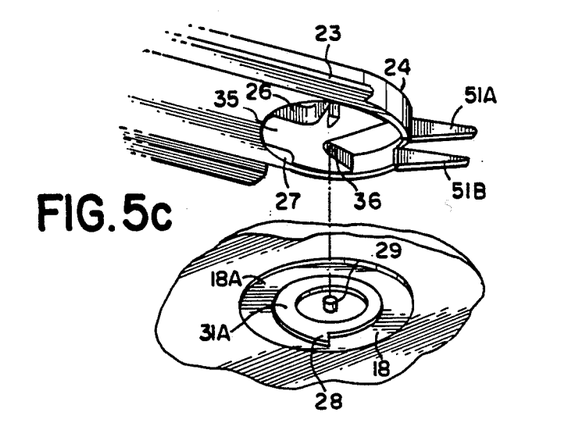
FIG. 5c is a cut away/exploded perspective view from below of the coupling device of this invention in which the disk hub has been axially displaced from a coupled and aligned position relative to the drive spindle.

Referring to FIG. 4, cartridge 10 is seen in a cut away perspective view from below as it engages spicule member 24 within disk drive 11. It should be noted that disk hub 18 has been cut away from this view in order to more clearly show the apparatus used for aligning the disk hub with the drive spindle. Drive spindle 19 is rotatably mounted to the spicule member 24 for rotation by drive shaft 32 of the preferred drive motor of this invention which is fully disclosed in co-pending application Ser. No. 854,342, filed Apr. 21, 1986. Spicule member 24 contains reference surfaces 23 which are a precise predetermined distance from the lower surface of drive spindle 19. When cartridge 10 is inserted into disk drive 11, rails 22A and 22B engage reference surfaces 23, as fully disclosed in co-pending application Ser. Nos. 854,419 and 854,292, filed Apr. 21, 1986. Resilient members 25 insure continued and firm contact between reference rails 22A, 22B and reference surface 23 while the cartridge is within disk drive 11. As previously mentioned, spring 50 exerts a force on disk hub 18 which holds the upper surface of the disk hub in a fixed position relative to the top 10B of cartridge 10. Referring now to FIGS. 5a-5c, the top surface of disk hub 18 comprises a generally disk shaped portion 31 having an aligning pin 29 extending from the center thereof. It should be noted that in FIG. 5a, only the drive spindle 19 of disk drive 11 is shown, the remainder of the disk drive being left out of this view so as to best reveal the relationship between spindle 19 and disk hub 18. It will be recalled, however, that spindle 19 is held fixed within the disk drive 11, and that cartridge 10 is also firmly held in a fixed position within the disk drive when fully inserted therein. Accordingly, Bernoulli surface 21 in cartridge top 10B is fixed in a predetermined plane relative to the lower surface 35 of drive spindle 19 when the cartridge is fully inserted in the disk drive.

As best revealed in FIG. 5a, aligning peg 29 rises above the plane formed by the generally disk shaped surface 31A of disk hub 18. In the preferred embodiment of this invention, spring 50 holds the surface of disk hub 18 within aperture 16 before the cartridge 10 is inserted in the disk drive. When the cartridge 10 is initially inserted in the disk drive 11, surface 31A will therefore be slightly above the plane formed by the lower surface of drive spindle 19. Ramps 51A and 51B project from the leading edge of spicule member 24 and are formed so as to have their most forward facing edges in a plane just slightly above the plane formed by surface 31A of disk hub 18 when the cartridge is initially inserted in disk drive 11. This relationship is easily achieved according to the teachings of this invention since the relationship between the internal portions of cartridge 10 and spicule member 24 are fixed once reference rails 22A and 22B engage with reference surface 23. Accordingly, as cartridge 10 is inserted into disk drive 11 the upper surface 31A of disk hub 18 engages ramps 51A and 51B and the disk hub is accordingly moved downward by the surface thereof against the urgence of spring 50. Following the sloped surface of ramps 51A and 51B, disk hub 18 is moved out of aperture 16, away from surface 21, and into a proper planar relationship with respect to drive spindle 19. When cartridge 10 is fully inserted into disk drive 11, the upper surface 31A of disk hub 18 will be in contact with the lower surface of drive spindle 19, as best revealed in FIG. 5a. Intimate surface to surface contact between the disk hub and the drive spindle is assured by the resilient force of spring 50 upon the lower portion of disk hub 18. An important feature of this invention resides in the urging force exerted by spring 50 so as to maintain the surface to surface contact between the disk hub and the drive spindle. In order for disk hub 18 to be properly aligned with drive spindle 19 in a radial direction, it is necessary that the surface to surface contact between the disk hub and the drive spindle is maintained so as to produce a frictional force between the surfaces which is less than the drag on the disks as they rotate. It will be appreciated by those skilled in the art that this requirement would render most, if not all, prior art devices unoperational since frictional force of this type is required to provide rotative coupling. That is, prior art devices relied upon the clamping force or frictional engagement between the disk or the disk hub and the drive spindle in order to impart inertia to the floppy disk. According to this invention, however, as will be fully disclosed hereinafter, rotational inertia is supplied to disk hub 18 primarily by drive pin 26; the clamping of disk hub 18 to drive spindle 19 is not only not unnecessary but also undesirable.

While the mechanism described above insures proper planar relationship between the surfaces of disk hub 18 and drive spindle 19, the radial relationship between the center of disk hub 18 and the center of drive spindle 19 will of necessity be dynamic until the disk hub 18 and the drive spindle 19 are fully coupled in the manner prescribed by this invention. This is because disk hub 18 and the associated floppy disks 17A and 17B must be free from frictional impairment in the radial direction in order to assure substantially frictionless rotation of the disks. That is, in order to insure proper rotation of the disks, there is a loose tolerance between the inner surface of disk hub 18 and the inner circumference of opening 20 in cartridge bottom 10A, as best revealed in FIG. 5a.

The inventive coupling device shown in FIGS. 5a-5c, 6, 7a, and 7b achieves the object of insuring and maintaining proper radial alignment of disk hub 18 and drive spindle 19 during high speed rotation of the disk hub by the drive spindle. Referring to FIG. 5c, disk hub 18 is shown in an exploded perspective view in which it has been axially displaced from a coupled and aligned position relative to the drive spindle. Disk hub 18 has a first major surface 18A to which floppy disk 17B is coaxially attached. A cylindrical body 31, having a diameter smaller than the first major surface 18A, extends axially from the first major surface. Cylindrical body 31 is coaxially mounted to surface 18A and is therefore coaxial with respect to the disks. Cylindrical body 31 also has second major surface 31A which is parallel to the first major surface 18A and is spaced therefrom. Protruding from the center of cylindrical body 31 is aligning pin 29. Drive spindle 19 is mounted to a third major surface 30 which is the lower surface of drive shaft 33 (see FIG. 7a and 7b). This third major surface 30 is approximately the same diameter as the first major surface 18A of disk hub 18 and is larger than the diameter of cylindrical body 31. Mounted coaxially to the third major surface 30 is an aligning member 27. Aligning member 27 has a V shaped aligning slot 36 therein, the apex of which substantially conforms to the shape of aligning pin 29 and is concentric with the third major surface 30. The lower surface of aligning member 27 constitutes a fourth major surface 35 which is parallel to and spaced from third major surface 30. The distance between the third major surface 30 and the fourth major surface 35 is equal to or greater than the distance that pin 29 extends past the plane formed by the second major surface 31A of disk hub 18. Drive lip 28 protrudes radially from cylindrical body 31. Drive lip 28 is comprised of a substantially delta shaped member formed into the outer surface of cylindrical body 31. The base of this delta shaped member extends substantially in a tangential manner from the periphery of cylindrical body 31 until it intersects with that portion of the delta shape member which extends radially from the cylindrical body. That portion of drive lip 28 which extends radially from cylindrical body 31 is in contact with drive pin 26 when the disk pair is rotated by the disk drive. Drive pin 26 extend axially from the fourth major surface 35 of drive spindle 19. The placement of drive pin 26 relative to V slot 36 is important for developing a proper centering force on pin 29. In the preferred embodiment, drive pin 26 is located on aligning member 27 in such a manner that a cord which (1)

contains drive pin 26 and (2) is parallel to a cord formed by joining the base points of V shaped member 36, passes over the opening formed by the V shaped member. Put in a different manner, drive pin 26 is located no greater than 90° from a line which bisects the angle formed by V slot 36.

Two features of this invention assure proper initial alignment of the disk hub 18 and drive spindle 19: first, the open end of V slot 36 faces towards the front of disk drive 11 when cartridge 10 is inserted into the disk drive; and second, cylindrical body 31, from which drive lip 28 projects, has an outer diameter less than the distance from the center of drive spindle 19 to the inner surface of drive pin 26. In this way, when disk cartridge 10 is inserted into disk drive 11, drive pin 29 is substantially contained within V slot 36 and drive pin 26 is free to rotate about the outer circumference of cylindrical body 31 until it interferes with drive lip 28. Therefore, when cartridge 10 is inserted in the disk drive 11, aligning pin 29 is approximately centered with respect to drive spindle 19 and drive pin 26 is in position for rotatable engagement with the leading surface of drive lip 28.

Figure 6:
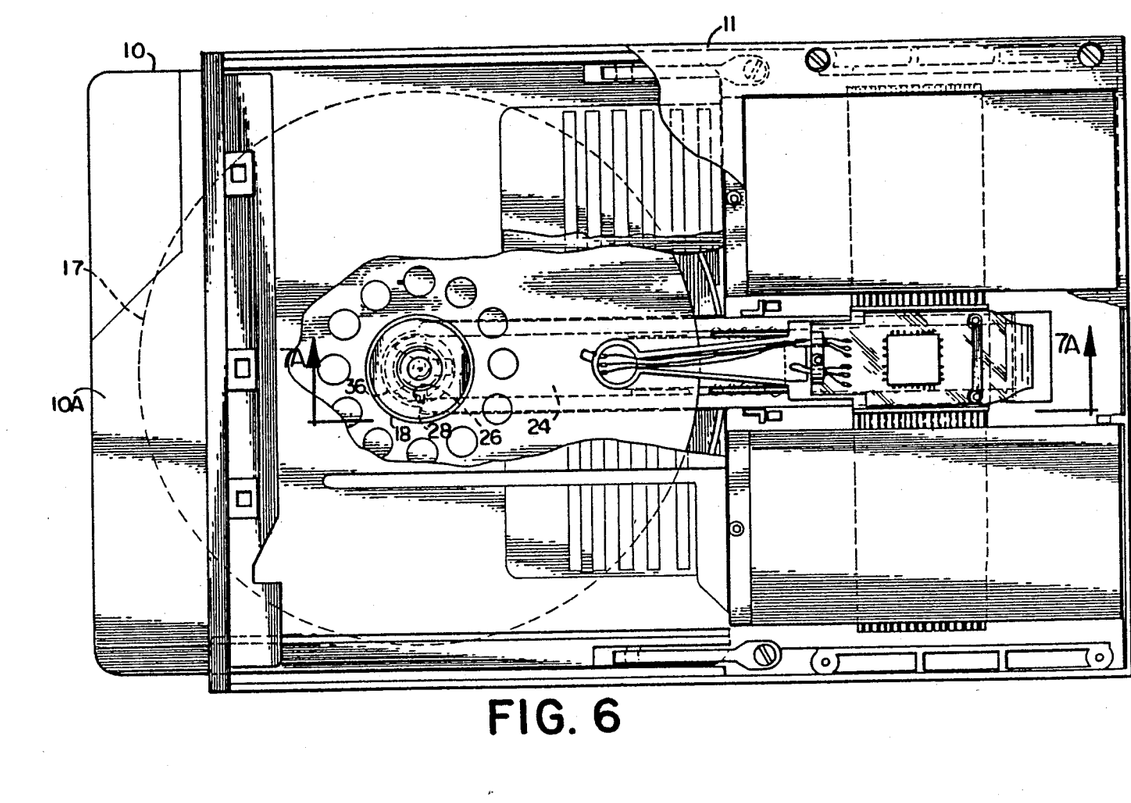
FIG. 6 is a cut away plan view from below showing a magnetic disk contained within a rigid cartridge coupled to a drive spindle contained within a disk drive.

FIG. 6, which is a cut away plan view from below, shows disk cartridge 10 fully inserted into disk drive 11. In this position, disk hub 18 is in planar alignment with drive spindle 19. In addition aligning pin 29 has been guided to the center of drive spindle 19 by V groove 36. As shown in cross sections in FIGS. 7a and 7b, drive pin 26 is in an interfering position with respect to drive lip 28. Actuation of drive shaft 32 by drive motor 33 causes rotation of drive spindle 19 which, through the interference of drive pin 26 with drive lip 28, causes rotation of disk hub 18 and consequently disks 17A and 17B. It should be noted that FIGS. 7a and 7b are "upside-down" cross sectional views since FIG. 6, from which they are taken, is a plan view from below. In addition, FIGS. 7a and 7b reveal an elastomeric disk 55 in place of the more preferred spring 50. A less preferred "disk spacer" type disk, hub 118, as revealed more fully in co-pending application Ser. No. 854,292 filed Apr. 21, 1986 is also disclosed in these figures.

When drive spindle 19 is rotated in the direction indicated in FIG. 5c, the interference of drive pin 26 with drive lip 28 produces a torque on disk hub 18 and thus imparts rotational momentum to disk hub 18 and disks 17A and 17B. This interference also produces a centering force on aligning pin 29 so as to force said aligning pin into the apex of V slot 36. Since the apex of V slot 36 is coaxial with drive spindle 19, disk hub 18 rotates coaxially with respect to the drive spindle. In this way, the floppy disks can be rotatably coupled to and properly radially aligned with drive spindle 19 without the use of relative axial force. The urging force of spring 50 merely insures proper contact between the surface of the disk hub and the spindle assembly so that the disks are spaced in proper planar relation to the disk drive. Since the rotational force of drive spindle 19 is transferred to disk hub 18 without frictional engagement between the disk and spindle, wear on both the disk hub and drive spindle is minimized. It should be noted that the only motive contact between drive spindle 19 and disk hub 18 required by this invention to rotate the disk pair is the interference of drive pin 26 with drive lip 28. This interference supplies both the rotational force as well as the centering force necessary to insure coaxial rotation of disk 17 by drive spindle 19.

While a particular embodiment of the invention has been shown and described, modifications are within the spirit and scope of this invention. The appended claims are intended to cover all such modifications.

What is claimed is:

1. A device for coupling and aligning a record disk to a drive spindle contained in a disk drive for rotation of said record disk, said device comprising:
   (a) a rotatable cylindrical drive spindle having at one end a surface substantially parallel to the plane of rotation of said disk and an aligning slot in said surface, said aligning slot having a closed end which terminates at about the axis of rotation of said drive spindle and an open end which extends to the perimeter of said drive spindle;
   (b) an aligning pin mounted to the disk and contained within said aligning slot upon entry of said disk into said disk drive; and
   (c) means for engaging and rotating said disk so as to urge said aligning pin into said closed end of said aligning slot, said engaging and rotating means including:
      (i) a disk hub mounted coaxially to the record disk;
      (ii) a drive lip on the disk hub extending from the circumference of the disk hub; and
      (iii) a drive pin mounted to said drive spindle and in contact with said drive lip such that rotation of said drive spindle causes rotation of said disk and urges said aligning pin into the apex of said aligning slot.

2. A device as recited in claim 1 wherein said aligning slot comprises a V shape slot, the apex of said V shape aligning slot comprising said closed end and the open portion of said V shape slot comprising said open end.

3. The device of claim 1 wherein said disk drive has an opening for receiving said record disk and wherein the open end of said aligning slot faces said disk drive opening upon entry of said disk into said disk drive.

4. A disk drive device for rotating a record disk having an aligning pin coaxially mounted thereto, comprising:
   (a) a drive spindle having a surface substantially parallel to the plane of rotation of said record disk and a V shape aligning slot in said surface, said aligning slot containing said aligning pin upon entry of said disk into said disk drive, wherein:
      (i) the side walls of said V shaped aligning slot inscribe less than a 180° angle in the surface of said drive spindle;
      (ii) the apex of said aligning slot is substantially coincidental with the axis of rotation of said drive spindle and shaped so as to substantially conform to the shape of said aligning pin; and
      (iii) the open portion of said V shape aligning slot permits entry of said aligning pin into said aligning slot without movement in a direction normal to said plane of rotation; and
   (b) means for providing rotational engagement between the disk and said drive spindle and for urging said aligning pin into the apex of said aligning slot, whereby said aligning pin is maintained concentric with said drive spindle, said means for providing rotational engagement including
      (i) a disk hub mounted coaxially to the disk;
      (ii) a drive lip mounted to the disk hub and protruding radially from the periphery of the disk hub; and (iii) a drive pin mounted to said drive spindle and in contact with said surface of said drive lip such that rotation of said drive spindle urges said aligning pin into the apex of said aligning slot.

5. The device of claim 4 wherein said disk drive has an opening for receiving said record disk and wherein the open end of said V shape aligning slot faces said disk drive opening upon entry of said disk into said disk drive.

6. A disk drive device for coupling and aligning a record disk with a disk drive motor for rotation thereby, said device comprising:
(a) a disk hub mounted coaxially to the record disk, said disk hub having:
   (i) a first major surface substantially parallel to the plane of rotation of said disk;
   (ii) a cylindrical body smaller in diameter than and protruding from said first major surface, said cylindrical body being coaxial with said disk and having a second major surface spaced from and parallel to said first major surface;
   (iii) a drive lip protruding radially from the periphery of said cylindrical body; and
   (iv) an aligning pin protruding from said second major surface and smaller in diameter than said cylindrical body, said pin being substantially coaxial with said disk hub;
(b) a drive spindle concentrically rotatable by the disk drive motor, a surface of said spindle being substantially parallel to the plane of rotation of said disk, and a V shaped opening in said surface, said V shaped opening having an apex substantially coincidental with the axis of rotation of said drive spindle and an open end which extends to the perimeter of said drive spindle; and
(c) a drive pin protruding eccentrically from said drive spindle and in contact with said drive lip, wherein the angle between the line which bisects the angle formed by said V shaped opening and the line connecting said pin with the axis of rotation of said spindle is no greater than about 90°, said drive pin converting rotational movement of said drive spindle into rotation of said disk hub and a centering force urging said aligning pin into the apex of said V shaped opening.

7. A disk drive device as recited in claim 6 wherein said drive lip comprises a member integral with said cylindrical body, said member having:
(a) an engaging portion extending radially from the periphery of said cylindrical body and extending axially the length of said cylindrical body; and
(b) a delta shaped support portion, the base of which extends in tangential fashion from the periphery of said cylindrical body to the radial extent of said engaging portion.

8. The device of claim 6 wherein said disk drive has an opening for receiving said record disk and wherein the open end of said V shaped opening faces said disk drive opening upon entry of said disk into said disk drive.

* * * * *